United States Patent
Micelli et al.

(10) Patent No.: US 10,960,876 B2
(45) Date of Patent: Mar. 30, 2021

(54) PATH PLANNING METHOD FOR COMPUTING OPTIMAL PARKING MANEUVERS FOR ROAD VEHICLES AND CORRESPONDING SYSTEM

(71) Applicants: Magneti Marelli S.p.A., Corbetta (IT); Università degli Studi di Parma, Parma (IT)

(72) Inventors: Piero Micelli, Parma (IT); Luca Consolini, Parma (IT); Mattia Laurini, Parma (IT); Marco Locatelli, Parma (IT); Axel Furlan, Corbetta (IT); Michele Giorelli, Corbetta (IT)

(73) Assignees: Magneti Marelli S.p.A., Corbetta (IT); Università degli Studi di Parma, Parma (IT)

( * ) Notice: Subject to any disclaimer, the term of this patent is extended or adjusted under 35 U.S.C. 154(b) by 232 days.

(21) Appl. No.: 16/021,357

(22) Filed: Jun. 28, 2018

(65) Prior Publication Data
US 2019/0001967 A1    Jan. 3, 2019

(30) Foreign Application Priority Data
Jun. 30, 2017    (IT) .................. 102017000073722

(51) Int. Cl.
*B60W 30/06*    (2006.01)
*G05D 1/02*    (2020.01)
(Continued)

(52) U.S. Cl.
CPC ............ *B60W 30/06* (2013.01); *B60W 50/14* (2013.01); *B62D 15/027* (2013.01);
(Continued)

(58) Field of Classification Search
CPC ................. B60W 30/06; B60W 50/14; B60W 2050/0034; B62D 15/027; B62D 15/0285;
(Continued)

(56) References Cited

U.S. PATENT DOCUMENTS

| | | | |
|---|---|---|---|
| 9,902,425 B2* | 2/2018 | Singh | B62D 15/028 |
| 2006/0111820 A1* | 5/2006 | Goetting | B62D 13/06 701/1 |

(Continued)

OTHER PUBLICATIONS

Search Report for Italian Patent Application No. 201700073722 dated Mar. 8, 2018. (2 Pages).
(Continued)

*Primary Examiner* — Behrang Badii
*Assistant Examiner* — Daniel L Greene
(74) *Attorney, Agent, or Firm* — Howard & Howard Attorneys PLLC (57) ABSTRACT

Path planning method for computing optimal parking maneuvers for road vehicles including the steps of computing a set of value functions of a cost function of parking maneuvers reaching the target set of states as unique viscosity solution of a Hamilton Jacobi Bellman equation, supplying the set of value functions, together with a starting state of the vehicle, as input to the dynamic programming calculation procedure calculating at least the set of vehicle controls. The set of equations modeling the evolution of the state of said road vehicle is a switched system of equations between a first sub-system if the vehicle is in forward motion and a second sub-system if the vehicle is in reverse motion. The cost function takes into account the arrival time a number of direction changes of the road vehicle between forward motion and reverse motion.

10 Claims, 6 Drawing Sheets

(51) Int. Cl.
*B62D 15/02* (2006.01)
*B60W 50/14* (2020.01)
*G01C 21/34* (2006.01)
*G05D 1/00* (2006.01)
*B60W 50/00* (2006.01)

(52) U.S. Cl.
CPC ..... *B62D 15/0285* (2013.01); *G01C 21/3446* (2013.01); *G05D 1/0088* (2013.01); *G05D 1/0217* (2013.01); *B60W 2050/0034* (2013.01); *G05D 2201/0213* (2013.01)

(58) Field of Classification Search
CPC .............. G01C 21/3446; G05D 1/0088; G05D 1/0217; G05D 2201/0213
See application file for complete search history.

(56) References Cited

U.S. PATENT DOCUMENTS

| | | | |
|---|---|---|---|
| 2010/0076640 A1* | 3/2010 | Maekawa | G05D 1/0217 701/26 |
| 2011/0060703 A1* | 3/2011 | Alaniz | G06N 20/00 706/12 |
| 2012/0072039 A1* | 3/2012 | Anderson | G06Q 10/06315 700/291 |
| 2016/0202670 A1* | 7/2016 | Ansari | G05B 13/048 700/45 |
| 2017/0015312 A1* | 1/2017 | Latotzki | B62D 15/027 |
| 2017/0129538 A1* | 5/2017 | Stefan | B60W 30/06 |

OTHER PUBLICATIONS

Dolcetta, I. Capuzzo, et al., "Optimal Switching for Ordinary Differential Equations," SIAM J. Control and Optimization, 22(1): 143-161, Jan. 1984.

Falcone, Maurizio, "Recent Results in the Approximation of Nonlinear Optimal Control Problems," Large Scale Scientific Computing, I. Lirkov, et al., Eds., pp. 15-32, 2014, Revised Selected Papers from the 9th International Conference, LSSC, Sozopol, Bulgaria, Jun. 3-7, 2013.

Takei, Ryo, et al., "Optimal Trajectories of Curvature Constrained Motion in the Hamilton-Jacobi Formulation," J. of Scientific Computing, 54(2-3):622-644, Feb. 1, 2013. (32 Pages).

* cited by examiner

PATH PLANNING METHOD FOR COMPUTING OPTIMAL PARKING MANEUVERS FOR ROAD VEHICLES AND CORRESPONDING SYSTEM

CROSS-REFERENCE TO RELATED APPLICATIONS

The present application claims priority to and all the benefits of Italian Patent Application No. 102017000073722, filed on Jun. 30, 2017, which is hereby expressly incorporated herein by reference in its entirety.

BACKGROUND OF THE INVENTION

1. Field of the Invention

The present description relates to techniques computing optimal parking maneuvers for road vehicles, operating in a known environment in the presence of static obstacles. The method comprises operating according to a dynamic programming calculation procedure to compute a set of vehicle controls implementing an optimal parking maneuver to reach a target state corresponding to a given parking target. The parking maneuvers are trajectories obtained by a system of equations modeling the evolution of the state of the road vehicle as a function of the set of vehicle controls. The method includes computing a set of value functions of a cost function of parking maneuvers reaching the target state as unique viscosity solution of a Hamilton Jacobi Bellman equation. The cost function takes into account the arrival time of the vehicle for a given parking maneuver, and supplies the set of value functions, together with a starting state of the vehicle, as input to said dynamic programming calculation procedure that calculates at least the set of vehicle controls.

2. Description of the Related Art

In recent times, many path planning methods used to compute optimal parking maneuvers for road vehicles, operating in a known environment in presence of static obstacles have been developed.

Early solutions on path-planning for the system represented the shortest path between two configurations as a concatenation of at most three lines or arc segments of constant curvature. In more recent years, due to the developments in automotive industry, path planning problems have received great consideration in literature and have been addressed with different approaches. Some solutions were based on geometrical considerations tailored to specific parking configurations, using simple algorithms for parallel parking. Other solutions use an incremental search on a multi-resolution lattice state space for generating dynamically-feasible maneuvers.

A different approach is represented by the numerical solution of the Hamilton-Jacobi-Bellman (HJB) equation. This method allows finding a deterministic solution to the motion planning problem, at the expense of a greater computational cost. For instance, this approach is used in R. Takei and R. Tsai. *Optimal trajectories of curvature constrained motion in the Hamilton-Jacobi formulation, Journal of Scientific Computing*, 54(2-3): 622-644, 2013, that considers the problem of optimal path planning for Dubins' and Reeds-Sheep's car models, using a finite difference numerical approximation of HJB equation.

SUMMARY OF THE INVENTION

An object of one or more embodiments is to overcome the limitations inherent in the solutions achievable from the prior art.

According to one or more embodiments, that object is achieved thanks to a method of the present invention. One or more embodiments may refer to a corresponding system.

The claims form an integral part of the technical teaching provided herein in relation to the various embodiments.

According to the solution described herein, the method includes the steps of providing a set of equations modeling the evolution of the state of the road vehicle that includes a switched system of equations between a first sub-system if the vehicle is in forward motion and a second sub-system if the vehicle is in rear or backwards motion, while a cost function taking into account in addition to the arrival time a number of direction changes of the road vehicle between forward motion and rear motion is also provided.

The solution described herein is also directed to a corresponding system for computing optimal parking maneuvers for road vehicles.

Other objects, features and advantages of the present invention will be readily appreciated as the same becomes better understood after reading the subsequent description taken in connection with the accompanying drawings.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment", that may be present in various points of the present description, do not necessarily refer to the one and the same embodiment. Further-more, particular conformations, structures, or characteristics can be combined appropriately in one or more embodiments.

The references used herein are intended merely for convenience and hence do not define the sphere of protection or the scope of the embodiments.

Figure 1:
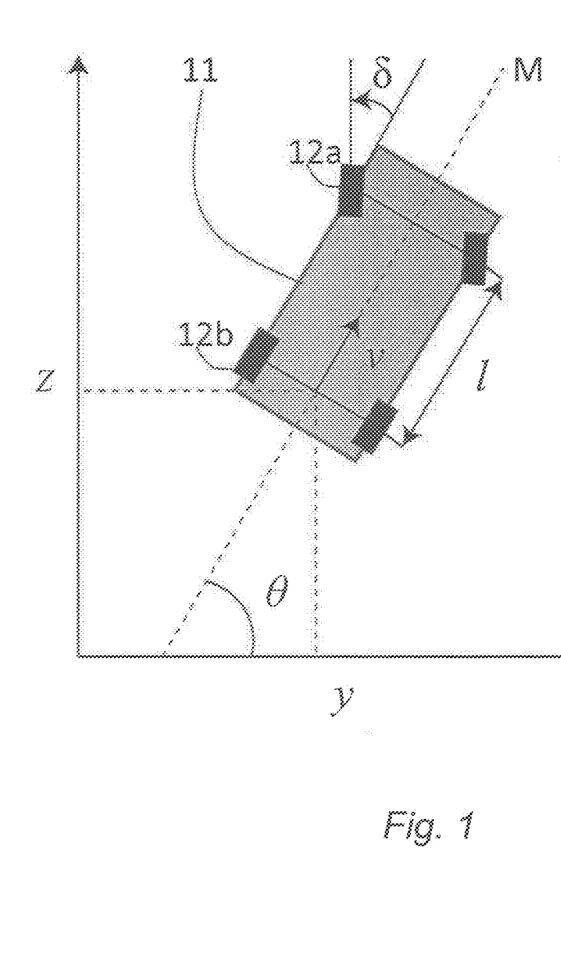
FIG. 1 represents a scenario of application of the method here disclosed.

In the following it will be assumed that the road vehicle is modeled by a kinematic car-like model with rear-wheel drive. To this regard, in FIG. 1 it is shown a road vehicle 11 with front wheels 12a separated by rear wheels 12b by a wheelbase distance 1, operating in a known environment in presence of static obstacles. As mentioned, it is assumed that the road vehicle 11 is described by the following kinematic car-like model with rear-wheel drive:

$$\begin{cases} \dot{z} = v\cos\theta \\ \dot{y} = v\sin\theta \\ \dot{\theta} = \omega \end{cases} \quad (1)$$

where (z,y) represents the position of the center of the rear wheel axle and θ an orientation angle (i.e., the angle of the main longitudinal axis M of the vehicle, which is the axis passing by the midpoint of the track distance separating the pair of wheels). In this way, the state of the vehicle 11 is represented by the triplet x=[z,y,θ]. The control input u is given by u=[v,ω], where v and ω are, respectively, the linear and angular velocities.

The angular velocity ω is related to the front wheel 12 steering angle δ (i.e., the angle of the direction of the wheel 12 with respect to the main vehicle axis M), by the relation $$\omega = \frac{1}{l} v \tan\delta.$$

The input variables, the linear velocity v and the steering angle, are constrained between minimum and maximum values as follows $$v_{min} < v < v_{max}, \delta_{min} < \delta < \delta_{max}.$$

Figure 4:
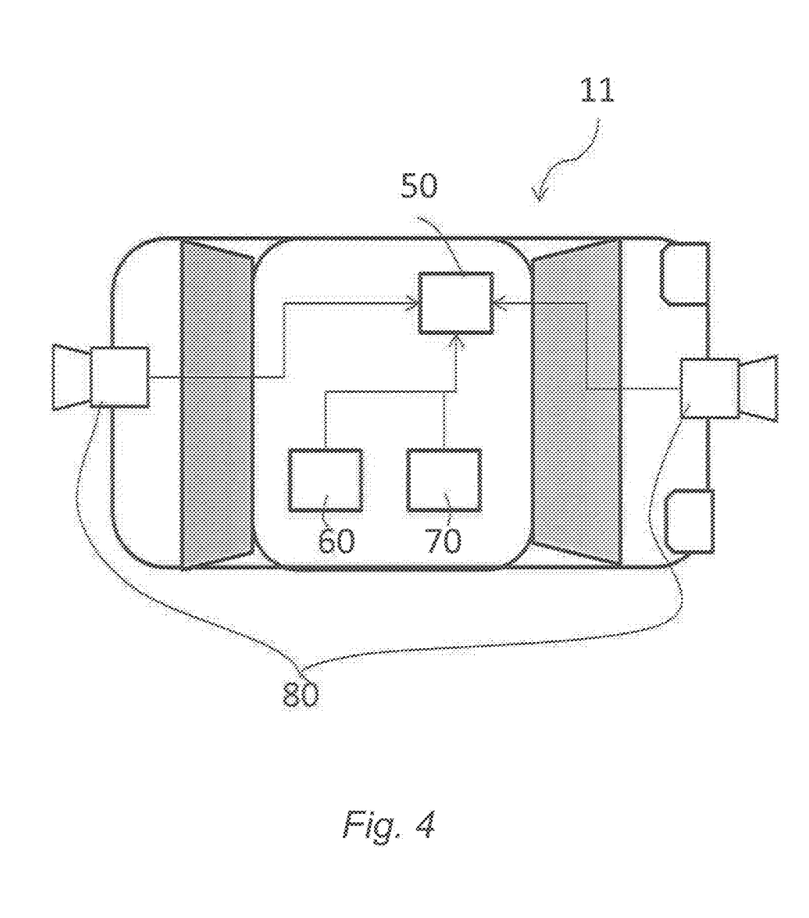
FIG. 4 represents a system implementing the method here described.

As described also with reference to FIG. 4, the vehicle 11 is equipped with sensors supplying the quantities defining the state of the vehicle 11, its pose x=[z,y,θ] and sensing the control input u=[v,ω].

As mentioned, the method here described makes use of the general approach represented by the numerical solution of the Hamilton-Jacobi-Bellman (HJB) equation. It is therefore provided to derive the Hamilton-Jacobi equation that models a class of curvature constrained motions in a maneuver space, which, as better described in the following, is represented as the union of a free space and a space with obstacles.

Under this view, also discussed with reference to step 110 in FIG. 4, it is first defined the optimization problem to be solved.

Thus, it is indicated with $\Omega_{op} \subset (\mathbb{R}^2 \times [0,2\pi])$ a bounded and connected domain, which represents the operating space of the road vehicle 11. This is the set of the poses (x, y, θ) of the vehicle, 11, which occupies a point (x, y) in a bi-dimensional space and has a direction (i.e., an orientation angle) θ. Such space 12 is partitioned as $\Omega_{op} = \Omega_{free} \cap \Omega_{obst}$, with $\Omega_{free} \cup \Omega_{obst} = \emptyset$, where $\Omega_{free}$ is the free space and $\Omega_{obst}$ is the subset of the operating space covered by obstacles.

The car-like vehicle 11 of FIG. 1, as also discussed with reference to step 120 in FIG. 4, is modeled by a switched system $\dot{x}(t) = f(x(t),i,\omega(t))$, where $f:\Omega \times \{1,2\} \times \mathbb{R} \to \Omega$ is the function defining the dynamics of the control problem, and is a function of the state x(t) as a function of time t, of the control input ω(t) as a function of time t, and of a gear switching index $i \in \{1,2\}$ which denotes an index representing if the vehicle 11 is in a forward moving gear or in a reverse moving gear. Namely, i=1 is associated to forward gear and i=2 to reverse gear.

The switched dynamics function f is defined as:

$$f(x, 1, \omega) = \begin{pmatrix} V_+(x)\cos\theta \\ V_+(x)\sin\theta \\ \omega \end{pmatrix}, \quad (2)$$

$$f(x, 2, \omega) = \begin{pmatrix} V_-(x)\cos\theta \\ V_-(x)\sin\theta \\ \omega \end{pmatrix}. \quad (3)$$

In other words, the dynamics function f includes a function for the forward motion f(x,1,ω) of the vehicle (i.e., with vehicle 11 in forward gear), and a function for the reverse motion of the vehicle f(x,2,ω) (i.e., with the vehicle 11 in reverse gear). This means that the switched system $\dot{x}(t) = f(x(t),i,\omega(t))$ includes two subsystems, corresponding to the function for the forward motion and the function for the reverse motion respectively, which can be selected by a controller, such as module 50 which will be described with reference to FIG. 4, on the basis of the value assumed by the gear switching index i in time.

The dynamics function f is dimensionally a velocity and $V_+, V_-: \Omega \to \mathbb{R}$ are respectively forward and reverse velocity functions defined by $$V_+(x) = \begin{cases} v_+ r & \text{if } x \in \Omega_{obst}, \\ v_+ & \text{otherwise} \end{cases},$$

$$V_-(x) = \begin{cases} v_- r & \text{if } x \in \Omega_{obst}, \\ v_- & \text{otherwise} \end{cases},$$

and 0<r<1 is a reduction factor, which can be set, which is in general a small number (i.e., r is smaller than one, usually much smaller than one). In some embodiments the reduction factor r is chosen 0.001, in other embodiments it could be chosen even smaller. Here, $v^- < 0 < v^+$ are the speeds associated to forward and reverse gears.

It is underlined that speeds $v^-, v^+$ are constant values, (i.e., the dynamics function f which defines the switched system is a function only of the state x, of the switching index i, and of angular velocity ω). With respect to the dynamics function f while the linear velocity v is constant with respect to its absolute value at values $v^-, v^+$, just its sign is changed when a gear switching takes place (i.e., $v = v^- \to v^+$).

It can be observed in the definition of the velocity functions $V_+$, $V_-$ that if the state of the vehicle $x \in \Omega_{obst}$ (i.e., it belongs to the subset of the operating space covered by obstacles $\Omega_{obst}$) the velocity of the vehicle 11 is reduced by a reduction factor r. Being such reduction factor r close to zero, the vehicle 11 is very slow when traveling on obstacles. Since there is interest in minimum time trajectories, such small values of the reduction factor r ensure that optimal trajectories will not intersect the subset of the operating space covered by obstacles $\Omega_{obst}$ for relevant intervals of time.

A control signal α is given by the couple α=(ω,σ), where ω: $[0,+\infty) \to [\omega_{min},\omega_{max}]$ is the steering control input represented by the angular velocity (which, as shown, is a function of the steering angle δ) and σ∈($\mathbb{R}$,{1,2})* indicates the sequence of gear switching corresponding to respective system configuration changes, for instance pairs of time coordinates $t_k$ and switching index values $i_k$. Namely, if $(t_k,i_k) \in \sigma$, then a controller switches switched system $\dot{x}(t)$ to the subsystem corresponding to the switching index $i_k$ value at time $t_k$. The sequence of switches of switched system $\dot{x}(t)$ satisfies the following inequalities:

$$0=t_1<t_2< \ldots <t_K,$$

$$i_{k-1} \neq i_k, 2 \leq k \leq K.$$

It is defined a gear switching function I:$\mathbb{R} \to \{1,2\}$ as $I(t)=i_{\bar{k}(t)}$ where $\bar{k}(t)=\max\{k\in\mathbb{N}:\tau_k \leq t\}$ (i.e., $\bar{k}(t)$ represents the total number of gear, or motion direction, switching occurring in the time interval [0,t].

Given the control signal α, α=(ω,σ)∈A, where ω is the control input as also discussed with reference to step 130 in FIG. 4, a trajectory of the switched system defined in equations (2), (3) is the solution of equation:

$$\begin{cases} \dot{x}(t) = f(x(t), I(t), \omega(t)) \\ x(0) = x_0 \end{cases} \quad (4)$$

and is denoted by $y_{x_0,\alpha}(t)=x(t)$. It represents the set of feasible paths or maneuvers from a given pose (x, y, θ) of the vehicle 11 associated with a given dynamics f.

Then it is considered a target set Γ∈Ω, closed and such that int(Γ)≠∅. The target set Γ can therefore include a plurality of target states. It is also indicated with P a positive real parameter, which, as better discussed in the following, is a penalty parameter P.

Thus, as also discussed with reference to step 140 in FIG. 4, it is defined a cost function $t_c:\Omega \times \{1,2\} \times A \to \mathbb{R} \cap \{+\infty\}$ that associates to each initial state $x_0$, initial configuration $i_0$ and control α∈A the cost defined as follows:

$$t_c(x_0, i_0, \alpha) = \begin{cases} +\infty & \text{if } y_{x_0,\alpha}(t) \notin \Gamma, \forall t > 0, \\ \inf_{t\in\mathbb{R}^+} \{t + P\bar{k}(t) : y_{x_0,\alpha}(t) \in \Gamma\} & \text{otherwise} \end{cases}$$

where it is considered cost $t_c(x_0,i_0,\alpha)=+\infty$ if the solution never reaches the target set Γ for any time t>0.

A value function T:$\Omega \times \{1,2\} \to \mathbb{R} \cap \{+\infty\}$ of the cost function $t_c$ is then obtained (see also step 150 of FIG. 4) as:

$$T(x_0, i_0) = \inf_{\alpha \in A} t_c(x_0, i_0, \alpha)$$

and represents the first or minimum time of arrival on the target set Γ, incremented by the product between the number of switchings and the positive constant represented by the penalty parameter P. The minimum is calculated with respect to the all possible controls α belonging to the control set A.

It is convenient to perform a rescaling of the value function T as a rescaled value function $V(x_0,i)$ (see also step 160 of FIG. 4):

$$V(x_0, i) = \begin{cases} \frac{1}{\lambda} & \text{if } T(x_0, i) = +\infty, \\ \frac{1}{\lambda} - \frac{1}{\lambda}e^{-\lambda T(x_0,i)} & \text{otherwise,} \end{cases} \quad (5)$$

where λ is a positive scalar. The change of variables of equation (5) is called the Kružlov transformation and gives several advantages. In particular, the value function V(x) takes values in $$\left[0, \frac{1}{\lambda}\right]$$

(whereas the non-scaled value function T is generally unbounded), and this helps in both the analysis and the numerical approximation.

Problem (5), defining the rescaled value function $V(x_0,i)$, can be addressed via a dynamic programming procedure. In particular, it falls into the class of optimal switching control problems discussed for instance in the publication I. C. Dolcetta and L. C. Evans "*Optimal switching for ordinary differential equations*", SIAM journal on control and optimization, 22(1):143-161, 1984. There, it is proven that the value function $V(x_0,i)$ is uniformly bounded, and Hoelder continuous, and is the unique viscosity solution of the following Hamilton Jacobi Bellman equation:

$$\max\begin{Bmatrix} V(x, i) - \min_{\bar{i} \neq i}\{P + V(x+\bar{i})\} \\ \lambda V(x, i) + \sup_{\omega \in W}\{-D(V)(x,i)f(x,i,\omega) - 1\} \end{Bmatrix} = 0, \quad (4)$$

where V∈C (Ω×{1,2},[0,+∞)),x∈$\mathbb{R}^n$, i∈{1,2} and W≡$[\omega_{min},\omega_{max}]$. Here, D(V)(x,i) denotes the gradient of function V at x $$\left(i.e., D(V)(x, i) = \left(\frac{dV(x, i)}{dx_1}, \ldots, \frac{dV(x, i)}{dx_n}\right)\right).$$

In the following, is described an analytical solving procedure presenting an analytical solution of the system of equations (6) with a sequence of decoupled QVIs (Quasi Variation Inequalities).

Then, the analytical solving procedure receives in input the target state set Γ, a target switching value $i_1$ (i.e., the final direction or gear of motion of the vehicle 11) and a termination tolerance ϵ, supplying as output the value functions $V^0, \ldots, V^K$, where K is the index representing the maximum number of gear switching, to perform the parking maneuver associated with the value function. In other words, the outputs correspond to the value function $V^0$ which requires zero switchings till the value function $V^K$, which requires K gear switching or direction switching between forward and reverse direction.

The analytical solving procedure includes for instance the following steps:

a) compute $V^0$ as the solution of $$\lambda V^0(x) + \sup_{\omega \in W}\{-D(V^0)(x)f(x, i_1, \omega) - 1\},$$

b) k = 0, i = $i_1$
c) while $\|V^k - V^{k-1}\|_\infty > \epsilon$ do
d) | k = k + 1,
e) | i = mod(i + 1, 2) + 1
f) | compute $V^k$ as the solution of $$\max\left\{ \begin{array}{c} V^k(x) - \{P + V^{k-1}(x)\} \\ \lambda V^0(x) + \sup_{\omega \in W}\{-D(V)(x)f(x, i, \omega) - 1\}) \end{array} \right\} = 0.$$

g) return $\{V^0, \ldots, V^K\}$

In step a) of the analytical solving procedure, the value function $V^0$ is computed as the solution of the HJB equation for a car-like vehicle 11 that proceeds to the final state set $\Gamma$ in forward ($i_1=1$) or backward ($i_1=2$) direction, without direction changes.

Then, in the loop formed by steps c)-e) the k-th cost function $V^k$ is computed so that, for any state x of the vehicle such that $V^k(x) < P + V^{k-1}(x)$ (i.e., the difference between two consecutive, with respect to the number of switchings k, value functions is greater than the penalty parameter P), the k-th cost function $V^k$ is the solution of the HJB equation applied alternatively to subsystems (2) and (3). In other words, $V^0, V^1, \ldots, V^K$ is a sequence of cost functions such that $V^k$ represents the value function that solves the optimal maneuvering problem with a maximum of k+1 gear switchings. In this way, the difference between two consecutive value functions, $V^k - V^{k-1}$ represents the decrease in value function that can be obtained by passing from k to k+1 gear switchings. This is reiterated until the stopping condition in line c), set by the termination tolerance is satisfied. It is underlined that such stopping condition makes loop c)-e) end when an additional k+1 gear switching does not significantly reduce the corresponding value function (i.e., the difference between two consecutive value functions is smaller than the termination tolerance E which has been set for the solving procedure just described).

The numerical implementation of the above analytical solving procedure, as it can be readily observed, relies on the solution of HJB's equations of the form:

$$\max\left\{ \begin{array}{c} V(x) - \phi(x) \\ \lambda V(x) + \sup_{\omega \in W}\{-D(V)(x)f(x, i, \omega) - 1\} \end{array} \right\} = 0, \quad (5)$$

with $\phi = P + V^{k-1}$, a value function with penalty (i.e., the sum of the penalty parameter P and of the previous value function).

In general, this partial differential equation does not admit a closed form solution. It is applied an approximation scheme based on a finite approximation of state and control spaces and a discretization in time.

Roughly speaking, in equation (7) one can approximate $$D(V(x))f(x,i,\omega) \cong h^{-1}(V(x+hf(x,i,\omega)) - V(x)),$$

where h is a small positive real number that represents an integration time.

In this way, the second member of equation (9) becomes $$(1 + \lambda h)V(x) = \min_{\omega \in W}\{V(x + hf(x, i, \omega)) + h\} = 0,$$

for $x \in \mathbb{R}^n$ and, by approximating $(1+\lambda h)^{-1} \cong (1-\lambda h)$, $(1+\lambda h)^{-1} h \cong h$ it is obtained the following discrete time HJB equation $$V_h(x) = \min\left\{ \begin{array}{c} \phi(x) \\ \min_{\omega \in W}\{(1 - \lambda h)V_h(x + hf(x, i, \omega)) + h)\} \end{array} \right\},$$

with $x \in \mathbb{R}^n$.

A grid is then computed on a finite set of vertices $S = \{x_l\} \subset \mathbb{R}^n$, $l=1, \ldots, p$. Evaluating the previous equation at $x \in S$, it is obtained $$V_h(x_l) = \min\left\{ \begin{array}{c} \phi(x_l) \\ \min_{\omega \in W}\{(1 - \lambda h)V_h(x_l + hf(x_l, i, \omega)) + h)\} \end{array} \right\}, \text{ with} \quad (6)$$

$l = 1, \ldots, p.$

Note the dependence of the value cost function on the choice of the integration step h. Using the grid, the function V can be approximated by a linear function of the finite set of variables $V_h(x_l)$, $l=1, \ldots, p$.

To further simplify equation (8), it is possible to perform a discretization of the control space, substituting W with a finite set of controls $\{\omega_1, \ldots, \omega_m\}$, so that it is possible to replace equation (8) with $$V_h(x_l) = \min\left\{ \begin{array}{c} \phi(x_l), \\ \min_{\omega_j}\{(1 - \lambda h)V_h(x_l + hf(x_l, i, \omega_j)) + h)\} \end{array} \right\}, \quad (7)$$

where $l=1, \ldots, p$ and $j=1, \ldots, m$ being the index of grid points and of the finite set of controls respectively.

Figure 2:
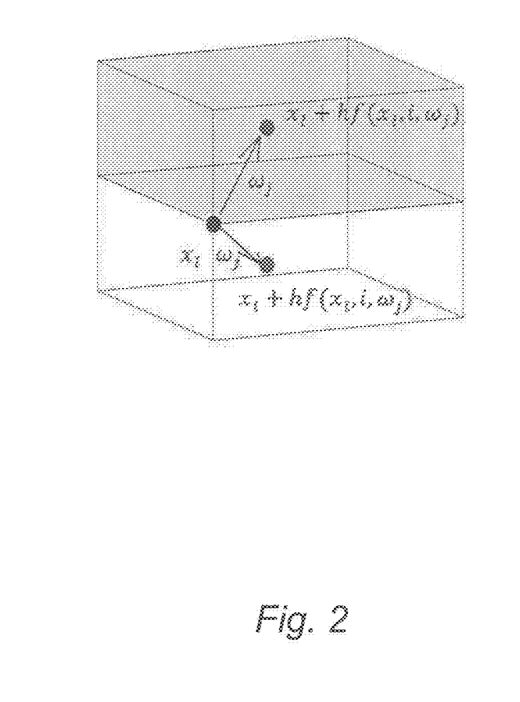
FIG. 2 illustrates a step of the method here disclosed.

FIG. 2 illustrates a step of construction of the right-hand side of problem (9). Namely, for each node $x_l$ of the grid and each value of the control $\omega_j$, all end points $x_l + hf(x_l, i, \omega_j)$ of the Euler approximation of the solution of equation (1) from the initial state $x_l$ are computed.

The value cost function for these end points $x_l + hf(x_l, i, \omega_j)$ is given by a multi-linear combination of its values on the grid vertices.

Set vector z: $=[V_h(x_1), V_h(x_2), \ldots, V_h(x_p)]$. In this way, $z \in \mathbb{R}^n$ represents the value of the cost function on grid points, or vertices $\{x_l\}$. Assuming that the value function with penalty $\phi$ is non-negative, for each $x_l, \omega_j$, the right-hand side of equation (9) is affine with respect to z, so that problem (9) can be rewritten in form $$z = \min_{j=1,\ldots,m}\{\phi(x_l), \min\{A_j z + b_j\}\} \quad (8)$$

where for $j=1, \ldots, m$, $A_j \in \mathbb{R}_+^{n \times n}$ are suitable nonnegative matrices and $b_j \in \mathbb{R}_+^n$ are suitable nonnegative vectors.

Let $w \in \mathbb{R}^n$, define a map M: $\mathbb{R}_+^n \to \mathbb{R}_+^n$ as $$M_w(z) := \min\{w, \min\{A_j z + b_j\}\},$$

it can be shown that M is a contraction, so that equation (10) can be solved as a fixed-point iteration. Namely, setting $$\begin{cases} x(s+1) = M_{\phi(x_l)}(x(s)), \\ x(0) = x_0, \end{cases}$$

the solution z of equation (10) is obtained as $z=\lim_{s\to\infty} x(s)$, for any initial condition $x_0$. Note that in equation (10) matrixes $A_j$ and vectors $b_j$ depend on subsystem $i \in \{1,2\}$. So, for any $w \in \mathbb{R}^n$ and $i \in \{1,2\}$, we define map $M_{w,i}: \mathbb{R}_+^n \to \mathbb{R}_+^n$ as $$M_{w,i}(z) := \min\{w, \min\{A_j^i z + b_j^i\}\}.$$

In the following is described a numerical solving procedure presenting a numerical implementation for solving system (4).

The numerical procedure includes as inputs target states set $\Gamma$, target switching gear $i_1$, the maximum number of gear switchings $K_{max}$, and the termination tolerance $\varepsilon$, supplying as output a set of value functions $V^0, \ldots, V^{K_{max}}$, having $K_{max}$ elements. The numerical procedure includes the steps:

a)    $V^0(0) = \dfrac{1}{\lambda}$
b)    $s = 0$
c)    while $\|V^0(s) - V^0(s-1)\|_\infty > \varepsilon$ do
d)    |   $V^0(s+1) = M_{P^0(0), i_1}(V^0(s))$
e)    |   $s = s + 1$
f)    $V^0 = V^0(s)$
g)    $i = i_1$
h)    for $i = 1, \ldots, K_{max}$ do
i)    |   $i = \mod(i+1, 2) + 1$
j)    |   $V^k(0) = P + V^{k-1}$
k)    |   $s = 0$
l)    |   while $\|V^k(s) - V^k(s-1)\|_\infty > \varepsilon$ do
m)    |   |   $V^k(s+1) = M_{P^k(0), i}(V^k(s))$
n)    |   |   $s = s + 1$
o)    |   $V^k = V^k(s)$
p)    return $\{V^0, \ldots, V^{K_{max}}\}$ In steps a)-f) of the above procedure, the value function $V^0$ is computed by a fixed-point iteration with error tolerance $\varepsilon$. In steps g)-o), $V^k$ is computed by contraction. Subsystems (2), (3), alternate until the chosen maximum number of direction or gear switchings $K_{max}$ is reached.

Such numerical solving procedure, as indicated with reference to FIG. 4, is the preferred implementation of the Hamilton Jacobi Equation solving procedure 200 there indicated.

In the solution of the car maneuvering problem, the optimal trajectory that reaches the target state set $\Gamma$ may end with either a forward maneuver ($i_1=1$) or with a reverse one ($i_1=2$). Thus, for any initial state $x_0$, it is defined the cost function $T^*: \mathbb{R}^n \to \mathbb{R} \cap \{+\infty\}$ as $$T*(x_0) = \min_{i \in \{1,2\}} T(x_0, i).$$

Defining the optimal final condition as $i^* = \{i \in \{1,2\} | T(x_0, i) = T^*(x_0)\}$ and letting $\{V^{*,0}, \ldots, V^{*,K_{max}}\}$ be the solutions of the numerical procedure, the feedback controls for the parking problem starting from starting state $x_0$ are given by the following control synthesis procedure. If $i^*=2$ the procedure is the same except for step d), where switching index i is set as mod (k+1,2)+1.

The control synthesis procedure includes as inputs the value functions $\{V^{*,0}, \ldots, V^{*,K_{max}}\}$ (the functions returned by the numerical solving procedure), the start state $x_0$ and a distance tolerance $\varepsilon_d$, supplying as outputs a vector $\Omega$ of the controls $\omega$ and an associated vector I of the switching indexes (i.e., the indexes of the subsystems). The control synthesis procedure includes then the steps:

a)    $x = x_0$
b)    $k = K_{max}$
c)    $l = 0$
d)    while $\text{dist}(x_1, x) > \varepsilon_d$
e)    |   while $\text{interp}(V^{*,k}, x) > \text{interp}(V^{*,k-1}, x)$ do
f)    |   |   $k = k - 1$
g)    |   $i = \mod(k, 2) + 1$
h)    |   $j^* = \underset{j}{\operatorname{argmin}}\{\text{interp}(V^{*,k}, x + hf(x, i, \omega_j))\}$
i)    |   $x = x + hf(x, i, (\omega_{j^*})$
j)    |   $\Omega[l] = \omega_{j^*}$
k)    |   $I[l] = i$
l)    |   $l = l + 1$
m)    return $[\Omega, I]$ Starting from initial state $x_0$, the proposed procedure performs the synthesis of feedback controls, and returns the vector $\Omega$ of controls and the vector of gear switchings I, that allow reaching the target state $x_1$. In loop formed by steps d)-l), the synthesis of feedback controls is obtained by a reiterated Euler integration step until the distance between the current state x and target state $x_1$ is less than the allowed distance tolerance $\varepsilon_d$.

In the internal loop e)-f), the current value function is updated. Note that function interp(V,x) evaluates the value cost function at x as a multi-linear interpolation of the vector V of the values of the cost function on grid vertices.

Basically, steps a)-c) correspond to the initialization of the variables (i.e., the current state x is initialized to the starting state $x_0$, and the number of switchings index k is initialized to the chosen maximum number of switchings $K_{max}$). A position index l of the vector $\Omega$ of controls and the vector of system switchings I is also set to zero. Then, while the distance between the current state (initially $x_o$) and the next state (initially $x_1$) is lower than the distance tolerance $\varepsilon_d$, it is evaluated if the current value function $V^{*,k}$, x in the current state is greater than the next value function $V^{*,k-1}$ in the current state (i.e., with a lower number of switchings k, in particular decreased by one). In the affirmative, the index k of the current value function is decreased by one and the difference with respect to the next value function evaluated. The index k is decreased till the current value function $V^{*,k}$, x is smaller than the next. Then it is updated the configuration index i according to the current value of k. Then it is found in step h), the control $\omega_j$ in the finite set of controls which minimizes the current value function, in particular its interpolation on the grid vertex corresponding to the current state. This step determines a control $\omega_j$ which is introduced in the vector $\Omega$ of controls at the current position index l, an associated configuration index i which is introduced in the vector of system configurations I at the current position index l. The state is updated by its finite approximation $x = x + hf(x, i, \omega_{j^*})$ evaluated from the current state and from the determined control $\omega_j$ and associated configuration index i.

Figure 3:
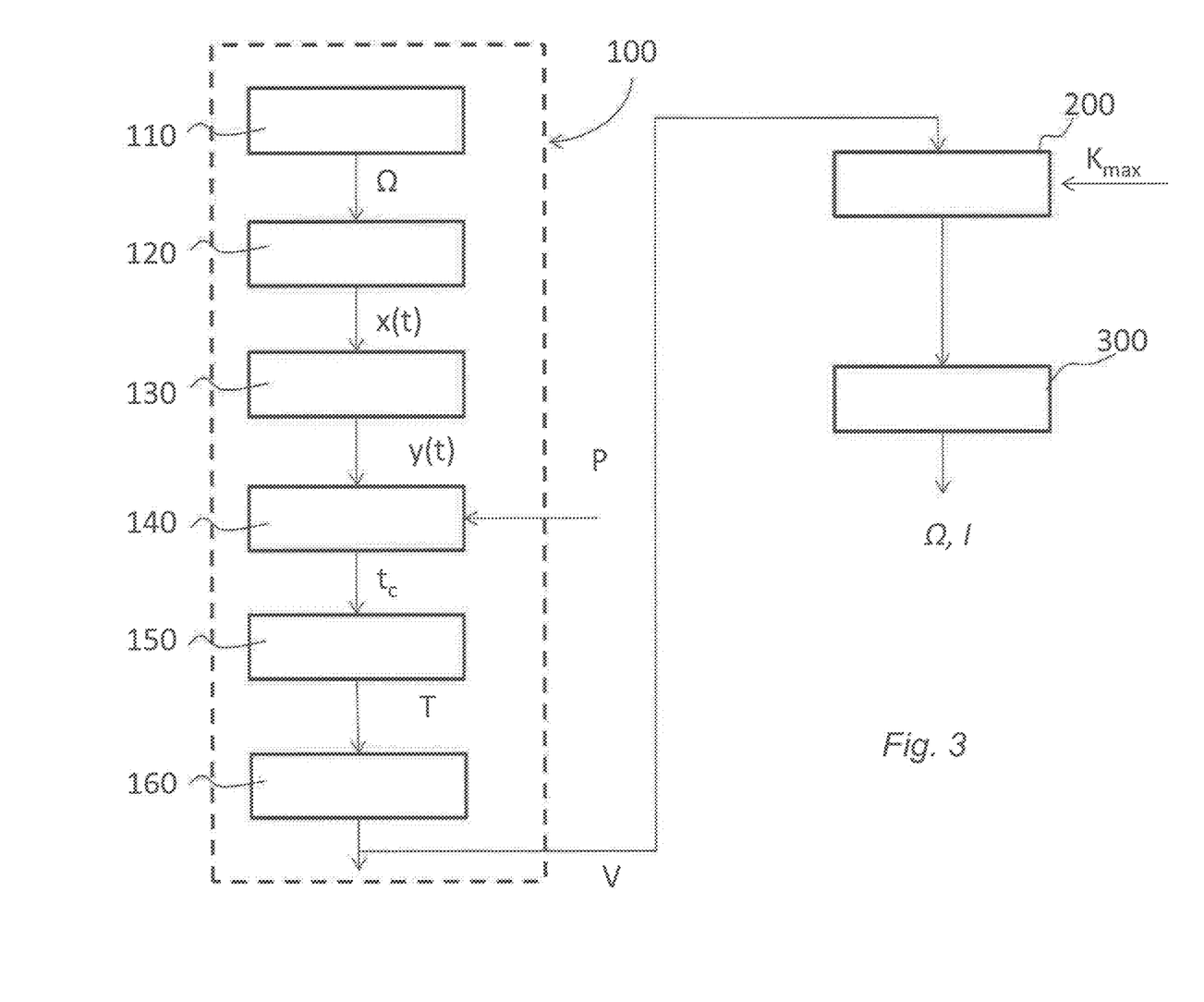
FIG. 3 is a flow diagram of the method here disclosed.

FIG. 3 shows a flow diagram which shows an embodiment of the method here described.

A value function definition procedure is designated at 100.

A step defining the operating space, or maneuver space, $\Omega_{Op}$, of the vehicle 11 (i.e., the set of the poses (x, y, θ) of the vehicle 11), preferably partitioned as $\Omega_{op} = \Omega_{free} \cap \Omega_{obst}$, with $\Omega_{free} \cup \Omega_{obst} = \emptyset$, is designated at 110, where $\Omega_{free}$ is the free space and $\Omega_{obst}$ is the subset of the operating space covered by obstacles.

A step of model definition (i.e., modeling by a system of equations the evolution of the state x(t) of said road vehicle as a function of the set of vehicle controls) is designated at 120. As previously discussed, this is done by a switched system $\dot{x}(t) = f(x(t), i, u(t))$, where equations (2) and (3) define the subsystems switching between a first sub-system if the vehicle 11 is in forward motion and a second sub-system if the vehicle 11 is in reverse or backwards motion.

A step of computing trajectories, where the trajectory of the switched system $\dot{x}(t)$ as defined in equations (2), (3) is defined as the solution of equation (4), representing the set of feasible paths or maneuvers from a pose (x, y, θ) associated with a given dynamics function $f$ is designated at 130.

The cost function $t_c$ that associates to each initial state $x_0$, initial configuration $i_0$ and control $\alpha \in A$, is designated at 140 and includes a cost represented by the arrival time in the target state summed to a number of direction changes k(t) of the road vehicle between forward motion and rear motion. The number of direction changes k(t) is multiplied by a penalty factor P (which can take also value one). The cost function is defined as infinite if the solution never reaches the target set Γ for any t>0.

Then, in a step 150 the value function T which represents the minimum value of the cost function with respect to the possible controls α (i.e., the minimum time of arrival on the target Γ) incremented by the product between the number of switchings k(t) is defined and the positive constant represented by the penalty parameter P.

Finally, it is preferably performed a rescaling of the value function T as a rescaled value function $V(x_0, i)$, using in particular equation (5) which is called the Kružkov transformation.

The definition procedure 100, which defines the value function $V(x_0, i)$, is followed by a solving procedure 200 of the Hamilton Jacobi Bellman equation with respect to the rescaled value function $V(x_0, i)$, which, as described, is preferably the numerical solving procedure described above, which involves obtaining a discrete time Hamilton Jacobi Bellman equation, performing also a discretization of the controls computing a grid on a finite set of vertices S, evaluating said discrete time Hamilton Jacobi Bellman equation on said set of vertices S.

The solving procedure 200 supplies the value functions, preferably the numerically computed value functions $\{V^{*,0}, \ldots, V^{*,K_{max}}\}$ which are used as input in a block 300 by the dynamic programming procedure 300, together with the starting state $x_0$ and a distance tolerance $\epsilon_d$, supplying as outputs the vector Ω of the controls ω and a vector I of the configuration indexes.

In FIG. 4 it is represented a system implementing the method computing optimal parking maneuvers for road vehicles, operating in a known environment in the presence of static obstacles. The road vehicle 11 includes at least a microprocessor based module 50 which receives from sensor modules, such as the GPS sensors and/or the IMU (Inertial Measurement Unit) module or other measurements modules sensing information regarding the position and dynamic of the vehicle 11, collectively indicated with the reference 60, information regarding the input quantities used by the model (1) (2) (3), namely the triplet x=[z,y,θ], the linear and angular velocities v and ω or the steering angle δ (i.e., the angle of the direction of the wheel 12 with respect to the main vehicle axis M, by the relation ω=1/lv tan δ) and also the switching index i. With 70 are also collectively indicated other units or microprocessors of the vehicle 11 which can possibly supply such information regarding the input quantities, may be on the vehicle bus or network, in particular CAN bus. Such information can also at least partly be supplied by external sources which can interface, for instance through wireless communication systems, with the vehicle network.

The step 110 of operative space definition can be performed offline, or it can be performed using information acquired by videocameras 80 on board the vehicle, for instance parking videocameras. Also in this the information regarding the operative space can be acquired by external sources, for instance external videocameras or digital maps.

The penalty parameter P value can be set by the user or by other systems controlling the vehicle 11 in order to adjust the output of the system. This also applies to the maximum number of gear switchings $K_{max}$.

The vector Ω of the controls ω and a vector I of the configuration indexes obtained by the method described, for instance in the microprocessor based module 50, can be used by the same microprocessor based module 50, or by a different module to drive the vehicle automatically during the parking maneuvers.

In variant embodiments, information based on the vector Ω of the controls ω and a vector I of the gear switching indexes obtained by the method described can be supplied as assistance information to a human driver, for instance displaying the value or a graphic representation of the control and/or gear switching to perform on a parking monitor. The controls ω could for instance be represented as a trace on the monitor to follow.

Now, tests performed by the method here described will be discussed.

Referring to the car-like model of FIG. 1, for the test are set the following values: $\delta_{max} = 0.44$ rad and l=2.57 m, setting $v^- = -1$ and $v^+ = 1$, the maximum angular velocity is given by $$\frac{1}{l} v^+ \tan \delta_{max} = 0.183 \text{ s}^{-1},$$

so that W={−0.183, 0.183}.

If $x_1$ is a target state, it is also set the target state set Γ as an ellipsoid centered in target state $x_1$ with semiaxes $r_x = r_y = 0.12$ m and $r_\theta = 0.08$.

FIGS. 4(A-D) show the path computed for a parallel parking maneuver scenario using different values of penalty P. FIG. 4A shows a test with penalty parameter P=0, number of switchings k=7 path length L=17.04 m. FIG. 4B shows a test with P=5 k=5 L=25.01 m. FIG. 4C shows a test with P=15 k=3 L=22.64 m. FIG. 4D shows a test with P=25 k=1 L=45.83 m.

A grid S with 525231 vertices was used to approximate the operative space $\Omega_{op} = [-8, 23] \times [-10, 10] \times [0, 2\pi)$, with target state $x_1 = [2, 8.5, \pi]$, and target configuration $i_1 = 1$. Note that, by increasing penalty P, the number of gear switchings decreases, while the shape of the path remains approximately the same, until, for high values of penalty parameter P, a single forward maneuver is planned with a significant increase of path length (i.e., arrival time) since the speed is constant.

Figure 5A:
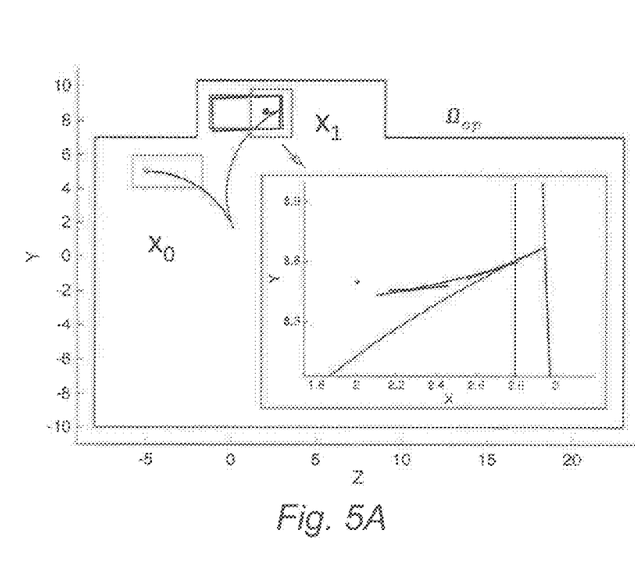
FIGS. 5A-5D represent tests of the method here described in a first scenario.
Figure 5B:
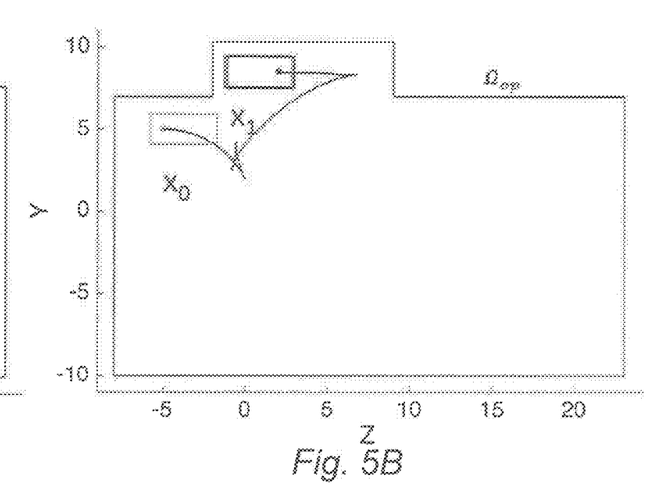
Figure 5C:
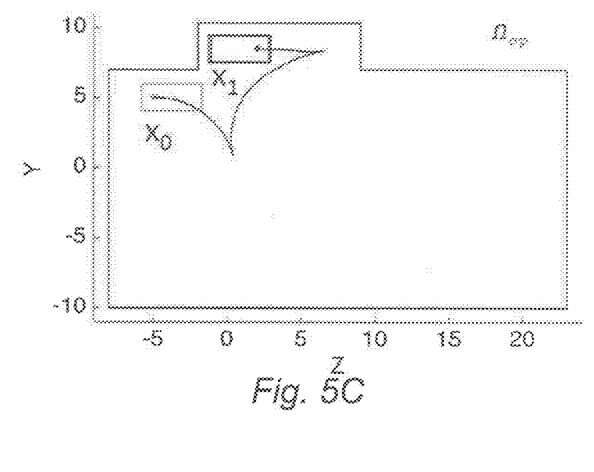
Figure 5D:
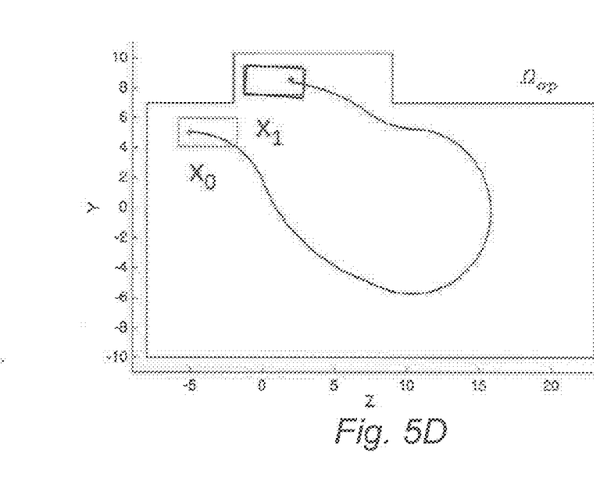

A similar consideration can be made for the perpendicular parking maneuver scenario of FIG. 5(A-C). FIG. 5A shows a test with obstacles with P=4 k=8 L=45.62 m. FIG. 5B shows a test with the same obstacles of FIG. 5A with P=24 K=4 L=42.7 m. FIG. 5C shows a test with the same obstacles of FIG. 5A with P=52 M=2 L=54.67 m. In this case a grid with 534216 vertexes is computed over $\Omega_{op}$=[−20,20]×[−15,15]×[0,2π), with target state $$x_1 = \left[9.55, -10.4, \frac{\pi}{2}\right],$$

and configuration $i_1$=1.

Figure 6A:
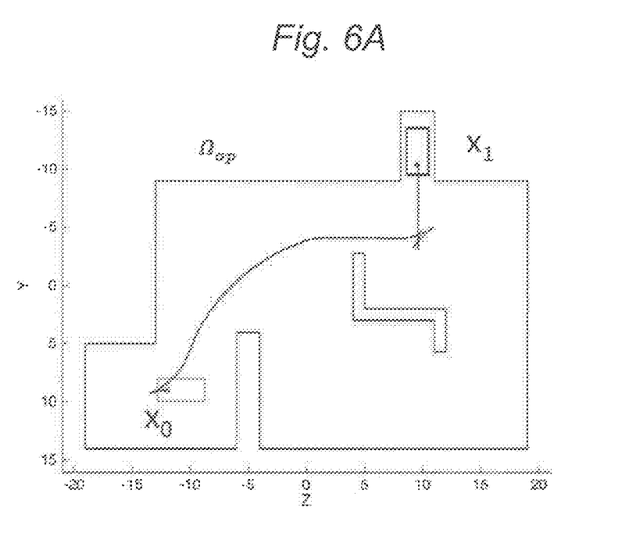
FIGS. 6A-6C represent tests of the method here described in a second scenario.
Figure 6B:
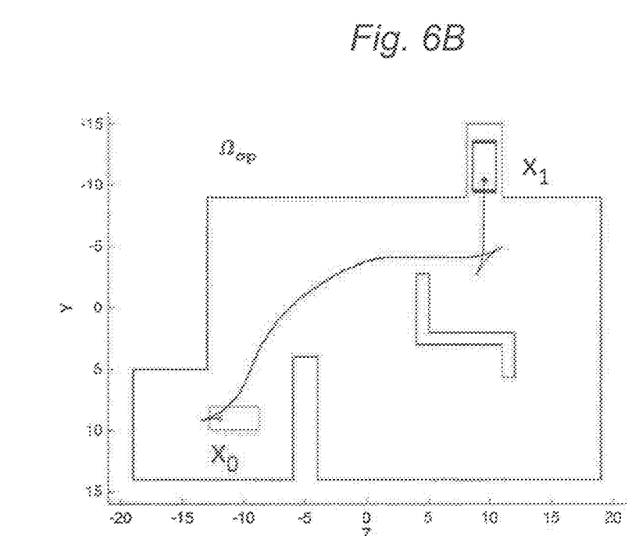
Figure 6C:
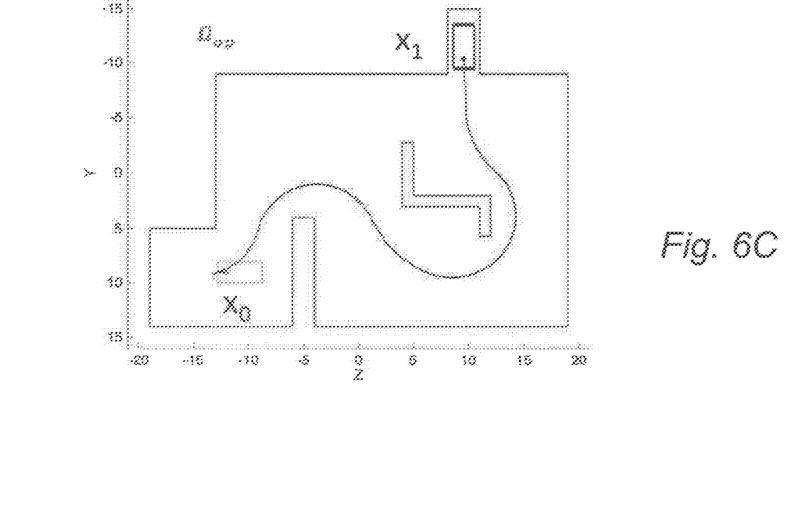
Figure 7:
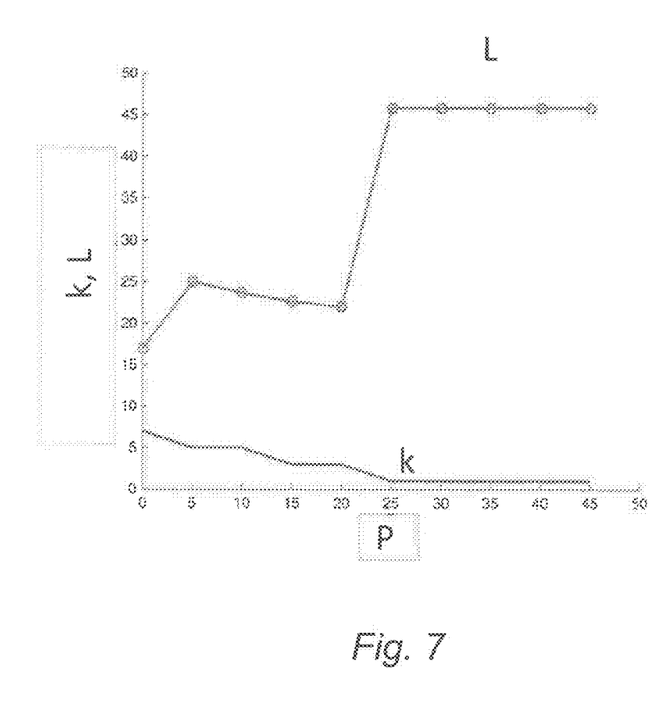
FIG. 7 represents a diagram showing the trend of parameters of the method here described.
Figure 8:
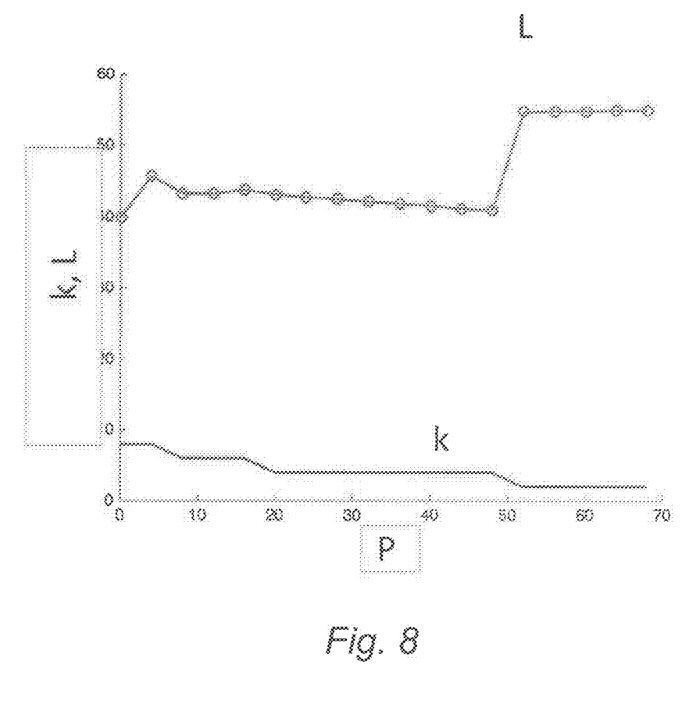
FIG. 8 represents a diagram showing another trend of parameters of the method here described.

FIGS. 6 and 7 show the number of switchings k and the length L of the path as a function of the penalty P for the parallel and perpendicular parking maneuvers described above. In accordance with problem formulation, increasing the penalty P the number of switchings k tends to decrease, while the length of the path (i.e., of the arrival time), tends to increase. The reason why in both cases the length L of the path is not a monotone increasing function of the penalty parameter P is probably related to the presence of numerical errors in the computation of the solution of HJB equation.

Thus, the advantages of the method and system just disclosed are clear.

The method and system described allows finding the optimal solution if the parking problem is feasible, in a deterministic way, which does not depend on random choices.

The method and system described are also general as they also allow to address any parking configuration.

The method and system described have a good human acceptability, since the solution obtained has a good correspondence with the parking maneuver that would be performed by a skilled human driver.

Of course, without prejudice to the principle of the embodiments, the details of construction and the embodiments may vary widely with respect to what has been described and illustrated herein purely by way of example, without thereby departing from the scope of the present embodiments, as defined the ensuing claims.

What is claimed is:

1. A path planning method for computing optimal parking maneuvers for road vehicles, in particular operating in a known environment in the presence of static obstacles, said method comprising operating according to a dynamic programming calculation procedure to compute a set of vehicle controls implementing an optimal parking maneuver to reach a target set of states corresponding to a given parking target, said parking maneuvers being trajectories obtained by a system of equations modeling the evolution of a state of said road vehicle as a function of vehicle controls, said method including the steps of:
computing a set of value functions of a cost function of parking maneuvers reaching said target set of states as unique viscosity solution of a Hamilton-Jacobi-Bellman equation, said cost function taking in account an arrival time of the vehicle for a given parking maneuver,
supplying said set of value functions, together with a starting state of the vehicle, as input to a control synthesis procedure calculating at least said set of vehicle controls,
wherein said set of equations modeling the evolution of the state of said road vehicle is a switched system of equations switching between a first sub-system if the vehicle is in forward motion and a second sub-system if the vehicle is in reverse or backwards motion,
said cost function taking into account further to said arrival time a number of direction changes of the road vehicle between forward motion and reverse motion, said set of value functions of said cost function comprising a sequence of said value functions according to an index corresponding to said number of direction changes ranging from a zero number of direction changes to a maximum number of direction changes, and
wherein said cost function takes into account the number of direction changes between forward motion and reverse motion multiplied by a settable penalty parameter.

2. The method as set forth in claim 1, wherein said set of vehicle controls includes a vector of controls and a vector of gear switchings.

3. The method as set forth in claim 1, further including the step of defining an operating space of the vehicle, preferably partitioned as free space is the free space and space with obstacles.

4. The method as set forth in claim 1, further including the step of rescaling of the value function as a rescaled value function.

5. The method as set forth in claim 1, wherein said step of computing a set of value functions of a cost function of parking maneuvers reaching said target set of states as unique viscosity solution of a Hamilton-Jacobi-Bellman equation further includes the step of performing a numerical solving procedure which includes obtaining a discrete time Hamilton Jacobi Bellman equation, performing a discretization of the controls, computing a grid on a finite set of vertices in said op operating space, evaluating said discrete time Hamilton-Jacobi-Bellman equation on said set of vertices.

6. The method as set forth in claim 1, wherein said dynamic programming procedure includes performing synthesis of feedback controls by a reiterated Euler integration step until the distance between the current and target state is less than an allowed distance tolerance.

7. The method as set forth in claim 1, wherein said switched system is defined by a dynamics function which is a function of the state of the road vehicle, of a gear switching index, and of an angular velocity of the vehicle, a linear velocity being kept constant at a determined value.

8. A system for computing optimal parking maneuvers for road vehicles comprising at least a microprocessor based module on the vehicle which receives from vehicle modules information regarding the position and dynamic of the vehicle, wherein said system performs the path planning method for computing optimal parking maneuvers of claim 1.

9. The system as set forth in claim 8 wherein said system supplies said set of vehicle controls to an automatic parking system.

10. The system as set forth in claim 8 wherein said system supplies said set of vehicle controls to an automatic parking system as assistance information to a human driver.

* * * * *